United States Patent Office 2,958,694
Patented Nov. 1, 1960

2,958,694

1-(AROYLALKYL)-4-(2'-PYRIDYL)PIPERAZINES

Paul Adriaan Jan Janssen, Antwerpse Steenweg 16', Vosselaar, near Turnhout, Belgium No Drawing. Filed June 22, 1959, Ser. No. 821,725

10 Claims. (Cl. 260—268)

The present invention relates to a new group of piperazine derivatives and more particularly to 1-(aroylakyl)-4-(2'-pyridyl)piperazines of the general structural formula

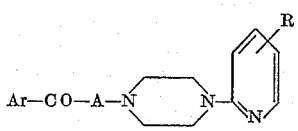

wherein Ar is a member of the class consisting of phenyl, tolyl, halophenyl, methoxyphenyl, dimethoxyphenyl, trimethoxyphenyl, and thienyl; A is a lower alkylene radical; and R is a member of the class consisting of hydrogen, methyl, cyano, and carboxamido.

The radical A in the foregoing formula is a bivalent saturated hydrocarbon radical and preferably one containing two to four carbon atoms, such as ethylene, trimethylene, propylene, tetramethylene, and butylene.

The compounds of the invention can be advantageously prepared by the condensation of a compound of the structural formula Ar—CO—A—Halogen with an appropriately selected pyridylpiperazine. The condensation can be carried out in an inert solvent such as an aromatic hydrocarbon (e.g. benzene, toluene, xylene), a lower alkanol (e.g. ethanol, propanol, butanol) and a lower alkanone (e.g. butanone, pentanone). In certain cases the reaction can be usefully accelerated by use of elevated temperatures. An alternate procedure employs the condensation of a 1-aroylalkylpiperazine of the formula

with a 2-halopyridine.

Alternatively, the compounds of this invention can be prepared by reacting a haloalkanonitrile of the formula NC—AO—Halogen with a pyridylpiperazine. The 4-pyridyl-1-piperazineanlkanonitrile of the formula

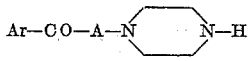

thus obtained is heated with an arylmagnesium halide of the formula

Ar—Mg—Halogen under Grignard conditions, followed by acid hydrolysis of the adduct.

Another method for the preparation of the compounds of this invention employs the acid hydrolysis of the appropriate 4-pyridyl-1-piperazinealkanonitrile to form the acid which is then converted to the acyl halide. A Friedel-Crafts reaction using the appropriate aromatic hydrocarbon results in the formation of the product.

Still another procedure for the preparation of the compounds of this invention uses as a starting material a compound of the formula Ar—CO—A—N—(CH₂CH₂X)₂ wherein X is a strong electronegative group such as halo, arylsulfonoxy, alkylsulfonoxy, and especially a chloro, bromo, a p-toluenesulfonoxy group. This compound is heated with a 2-aminopyridine.

The compounds of this invention are depressants of the central nervous system, they are anti-convulsants, hypnotics, barbiturate potentiators, analgesics and inhibitors of peristalsis.

The organic bases of this invention form pharmaceutically useful non-toxic salts with a variety of inorganic and strong organic acids including sulfuric, phosphoric, hydrochloric, hydrobromic, hydroiodic, sulfamic, citric, lactic, maleic, malic, succinic, tartaric, cinnamic, acetic, benzoic, gluconic, ascorbic, and related acids. They also form quaternary ammonium salts with a variety of organic esters of sulfuric, hydrohalic and aromatic acids. Among such esters are methyl chloride and bromide, ethyl chloride, propyl chloride, butyl chloride, isobutyl chloride, benzyl chloride, and bromide, phenethyl bromide, naphthylmethyl chloride, dimethylsulfate, diethylsulfate, methyl benzenesulfonate, ethyl toluenesulfonate, ethylene chlorohydrin, propylene chlorohydrin, allyl bromide, methallyl bromide and crotyl bromide.

The compounds which constitute this invention and the methods for their preparation will appear more fully from a consideration of the following examples, which are given for the purpose of illustration only and are not to be construed as limiting the invention in spirit or in scope. In these examples quantities are indicated as parts by weight, temperatures are expressed in degrees centigrade (° C.), and pressures are expressed in millimeters of mercury, (mm.).

EXAMPLE 1

A solution of 71 parts of γ-chlorobutyryl chloride and 63 parts of benzene are added with stirring and cooling to a suspension of 71 parts of aluminum chloride in 310 parts of benzene. After the addition is completed, the cooling bath is removed, and the stirring is continued for 30 minutes. The reaction mixture is poured into ice water. The benzene layer is separated, dried over anhydrous sodium sulfate, and filtered. The filtrate is concentrated under reduced pressure to remove the benzene and the residue is distilled to yield γ-chlorobutyrophenone boiling at about 134–137° C. at 5 mm. pressure.

Using equimolar amounts of toluene in place of the benzene in the preceding paragraph of this example yields γ-chloro-4'-methylbutyrophenone boiling at about 100–110° C. at 4 mm. pressure.

By substituting δ-chlorovaleryl chloride for the γ-chlorobutyryl chloride in the experiment of the first paragraph of this example, δ-chlorovalerylphenone is obtained.

EXAMPLE 2

To a suspension of 341 parts of aluminum chloride in 1740 parts of carbon disulfide are added 96 parts of fluorobenzene with stirring and cooling. While the temperature is maintained at about 10° C. 141 parts of γ-chlorobutyryl chloride are added. After the addition is completed, the cooling bath is removed and the stirring is continued for two hours. The reaction mixture is poured into ice water. The organic layer is separated, extracted with water, dried over anhydrous sodium sulfate, and filtered. The filtrate is concentrated under reduced pressure, and the resulting residue is distilled to yield γ-chloro-4'-fluorobutyrophenone boiling at about 136–142° C. at 6 mm. pressure.

By using equivalent amounts of the appropriately substituted benzenes and otherwise proceeding as above, the following aroylalkyl chlorides are obtained:

Table I

Ar—CO—A—Cl

| Ar | A | Boiling Point | Melting Point, °C |
|---|---|---|---|
| 4-ClC$_6$H$_4$ | (CH$_2$)$_3$ | b$_6$=135–140° C | |
| 4-CH$_3$OC$_6$H$_4$ | (CH$_2$)$_3$ | b$_6$=175° C | |
| 4-CH$_3$C$_6$H$_5$ | (CH$_2$)$_3$ | | 31.5 |
| 2,4-(CH$_3$O)$_2$C$_6$H$_3$ | (CH$_2$)$_3$ | | 61–62 |
| 3,4-(CH$_3$O)$_2$C$_6$H$_3$ | (CH$_2$)$_3$ | | 92.0–93.0 |

EXAMPLE 3

A mixture of 86.4 parts of 2-bromo-4-methyl-pyridine, 85 parts of anhydrous piperazine, 53 parts of sodium carbonate, and 120 parts of pentanol is stirred and refluxed for five hours with continual removal of the water formed. The mixture is filtered and the filter-cake washed with butanol. The combined filtrate and washings are concentrated under reduced pressure. The oily residue, 1-(4'-methyl-2'-pyridyl)piperazine, is distilled in vacuo and the fraction boiling at 161–163° C. at a pressure of 8 mm. is collected.

An equimolar substitution of 2-bromo-5-methylpyridine and 2-bromo-3-methylpyridine for 2-bromo-4-methylpyridine in the above example yields 1-(5'-methyl-2'-pyridyl)-piperazine, melting at about 76.5–78° C. and 1-(3'-methyl-2'-pyridyl)piperazine.

EXAMPLE 4

A mixture of 50 parts of 2-bromo-6-methylpyridine, 60 parts of anhydrous piperazine, 29 parts of sodium carbonate, and 80 parts of pentanol is refluxed for five hours. Upon cooling the mixture is diluted with methanol, filtered, and the solvent is evaporated. After distillation, 1-(6'-methyl-2'-pyridyl)piperazine, a viscous, colorless liquid with a boiling point of 164–166° C. at 17 mm. pressure, is obtained.

EXAMPLE 5

A mixture of 5 parts of 2-chloro-3-cyanopyridine, 6.2 parts of anhydrous piperazine, 3.8 parts of sodium carbonate, and 5 parts of pentanol is stirred, refluxed for five hours, and the hot solution is filtered. At —20° C. a precipitate forms and is removed by filtration. The filtrate is evaporated and the residue is taken up in diisopropyl ether. The precipitate is collected and dried in vacuo at 30° C. to yield the pale-yellow powder of 1-(3'-cyano-2'-pyridyl)piperazine which melts at about 97–98° C.

EXAMPLE 6

To 108.5 parts of β-chloropropionic acid are added 97.8 parts of phosphorous trichloride. The mixture is refluxed for 3 hours and then cooled. The solution is decanted and 84 parts of thiophene and 800 parts of benzene are added. The mixture is cooled to about —5° C., and 312.6 parts of stannic chloride are added portionwise over a period of 3 hours. Stirring is continued for 2 hours without cooling. The solution is filtered and the filtrate is extracted with 1200 parts of benzene. The solvent is evaporated leaving an oil which solidifies in 400 parts of ether. The precipitate is collected by filtration and redissolved in 400 parts of ether. The solution is filtered and the filtrate is evaporated. The residue is distilled to yield 2-(β-chloropropionyl)thiophene boiling at about 119–121° C. at 6 mm. pressure.

EXAMPLE 7

A Grignard reagent is prepared by the addition of 41 parts of 2-thionyl bromide, 80 parts of ether, 6 parts of magnesium and a small quantity of iodine. A solution of 30 parts of δ-chlorovaleronitrile in 80 parts of dry ether is added slowly to the Grignard reagent and the mixture is refluxed for three hours. After prolonged stirring, the mixture is decomposed with 50% hydrochloric acid. After separation, the ether layer is dried over magnesium sulfate. The solution is filtered, evaporated and fractionated to yield 2-(δ-chloropentanoyl)-thiophene boiling at about 155–163° C. at 3 mm. pressure.

EXAMPLE 8

A suspension of 8.4 parts of β-chloropropiophenone and 16.3 parts of 1-(2'-pyridyl)piperazine in ether is allowed to remain overnight at room temperature, and then boiled in 600 parts of ether and filtered. The filtrate is evaporated on a water bath to yield a nonviscous, transparent oil which is extracted with 240 parts of diisopropyl ether. After evaporation at room temperature the oil is taken up in 240 parts of acetone. Hydrogen chloride gas is passed through the solution and the precipitate is collected and dried at 50° C.

The dihydrochloride formed is dissolved in water and the solution is made slightly basic by the addition of sodium hydroxide. The mixture is then extracted with 400 parts of ether. The ether extract is dried on potassium carbonate, filtered and evaporated to a volume of about 100 parts. After cooling to 0° C. for three days, the precipitate is collected. This white amorphous powder of 1-(β-benzoylethyl)-4-(2'-pyridyl)piperazine melts at about 66–69° C. It has the structural formula

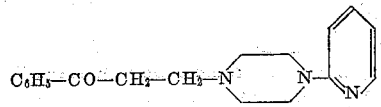

EXAMPLE 9

To 8.4 parts of β-chloropropiophenone in 600 parts of benzene are added gradually 21 parts of 1-(2'-pyridyl)-piperazine in 200 parts of benzene and with constant stirring over a four hour period. The stirring is continued for another four hours and the precipitate is removed. The filtrate is washed with 250 parts of water and then evaporated to yield an oil. This is taken up in 400 parts of isopropanol. Hydrogen chloride gas is passed through the solution and the precipitate formed is collected and recrystallized repeatedly from 500 parts of isopropanol and 240 parts of methanol. The melting point of the white amorphous powder of 1-(β-benzoylethyl)-4-(2'-pyridyl)piperazine dihydrochloride is about 214–215° C.

EXAMPLE 10

A mixture of 5.8 parts of δ-chlorovalerophenone and 10 parts of 1-(2'-pyridyl)piperazine is heated at about 100° C. for ten hours. The mixture is then treated with 600 parts of dry ether and the precipitate is removed by filtration. The solvent is evaporated to yield an oil which is taken up in 400 parts of ether. Hydrogen chloride gas is passed through the solution and the precipitate is collected and recrystallized from a mixture of 200 parts of acetone, 400 parts of isopropanol and 100 parts of methanol. After drying the pale-brown amorphous powder of 1-(δ-benzoylbutyl)-4-(2'-pyridyl)-piperazine dihydrochloride which melts at about 206.5–207.5° C. is obtained.

EXAMPLE 11

A mixture of 5.1 parts of γ-chlorobutyrophenone and 10 parts of (2'-pridyl)piperazine is heated for fifty hours on an oil bath at 115° C. The mixture is then treated with 100 parts of water and extracted with ether. This extraction is dried over magnesium sulfate, filtered and evaporated to yield 1-(γ-benzoylpropyl)-4-(2'-pyridyl)-piperazine as a pale brown amorphous powder, melting at about 63–64.8° C.

By substituting 5.9 parts of γ-chloro-4-methylbutyrophenone for 5.1 parts of γ-chlorobutyrophenone in the above procedure, an amorphous powder melting at about 92–93° C. of 1-[γ-(4'-methylbenzoyl)propyl]-4-(2'-pyridyl)piperazine is collected.

By substituting 7.2 parts of γ-chloro-3',4'-dimethoxybutyrophenone for 5.1 parts of γ-chlorobutyrophenone in the first paragraph of this example and after recrystallizing from acetone, the small crystals of 1-[γ-(3',4'-dimethoxybenzoyl)propyl]-4-(2'-pyridyl)piperazine can be obtained. This compound melts at about 104.5–106.9° C.

EXAMPLE 12

A mixture of 4.55 parts of γ-chlorobutyrophenone and 8.9 parts of 1-(6'-methyl-2'-pyridyl)piperazine is heated on an oil bath for eight hours. The mixture is then boiled in 80 parts of diisopropyl ether and the solid residue is removed. To the filtrate is added petroleum ether and the mixture is kept at −20° C. The crystals of 1-(γ-benzoyl)propyl - 4 - (6'-methyl-2'-pyridyl)piperazine are collected and dried. The pale-yellow amorphous powder melts at about 72–75.8° C. The compound has the formula

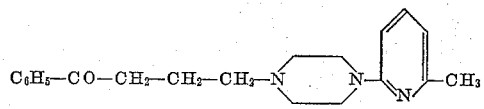

EXAMPLE 13

A mixture of 4.55 parts of γ-chlorobutyrophenone and 8.9 parts of 1-(4'-methyl-2'-pyridyl)piperazine is heated on an oil bath at 115° C. for eight hours. The mixture is then refluxed with 120 parts of diisopropyl ether and the solid is collected. The precipiate is recrystallized from 60 parts diisopropyl ether at −20° C., collected, and dried in vacuo to give 1-(γ-benzoyl)propyl-4-(4'-methyl-2'-pyridyl)piperazine. The shiny white platelets of this compound melt at about 65.5–66.5° C.

EXAMPLE 14

A mixture of 4.55 parts of γ-chlorobutyrophenone and 9.5 parts of 1-(3'-cyano-2'-pyridyl)piperazine is heated on an oil bath for eight hours at 110° C., cooled and treated with 100 parts of water and 80 parts of ether. The ethereal layer is separated, washed with water, dried over sodium sulfate and evaporated. The residue left is recrystallized from 40 parts of diisopropyl ether to give 1 - (γ - benzoyl)propyl-4-(3'-cyano-2'-pyridyl)piperazine. Upon drying, this yellow amorphous powder melts at about 45.5–47° C.

EXAMPLE 15

To a boiling solution of 69 parts of anhydrous piperazine in 160 parts of toluene is added 36.4 parts of γ-chlorobutyrophenone in 40 parts of toluene with stirring in the course of one hour. The boiling and stirring is continued for two hours after which the mixture is cooled, filtered, and the filtrate evaporated. The residue is fractionated under vacuum to obtain 1-(γ-benzoylpropyl)-piperazine boiling at about 179.5–180° C. at 2 mm. pressure.

A mixture of 7 parts of 1-(γ-benzoylpropyl)piperazine, 2.3 parts of 2-chloropyridine-3-carboxamide, and 40 parts of isopropanol is refluxed for fifteen hours. After cooling the isopropanol is evaporated. The residue is washed with water and ether and recrystallized from isopropanol to give white amorphous 1-(γ-benzoylpropyl)-4-(3'-carboxamido-2'-pyridyl)piperazine, melting at about 112.6–114.2° C.

EXAMPLE 16

A mixture of 4.55 parts of γ-chlorobutyrophenone and 8.9 parts of 1-(5'-methyl-2'-pyridyl)piperazine is heated at 100–110° C. for eight hours. After cooling, the mixture is treated with 100 parts of water. The water layer is extracted twice with 80 parts of benzene. The combined benzene layers are dried over sodium sulfate, and evaporated. After recrystallization of the solid residue from diisopropyl ether, 1-(γ-benzoylpropyl)-4-(5'-methyl-2'-pyridyl)piperazine melts at about 71.5–73° C.

By substituting 5 parts of γ-chloro-4'-fluorobutyrophenone for the γ-chlorobutyrophenone in the above procedure, 1-[γ-(4'-fluorobenzoyl)propyl]-4-(5'-methyl-2'-pyridyl)piperazine is obtained, the yellow crystals melt at about 92–93° C.

By substituting γ-chloro-4'-iodobutyrophenone for γ-chlorobutyrophenone in the first paragraph of this example, 1-[γ-(4'-iodobenzoyl)propyl]-4-(5'-methyl-2'-pyridyl)piperazine is obtained.

EXAMPLE 17

To 5.6 parts of β-chloro-4'-fluoropropiophenone are added 10 parts of 1-(2'-pyridyl)piperazine with cooling. The mixture is extracted with boiling ether and the extract is washed with water, dried over sodium sulfate, and evaporated to a solid residue. After recrystallization from ether and drying, the pale yellow transparent crystals of 1 - [β - (4' - fluorobenzoyl)ethyl] - 4-(2'-pyridyl)-piperazine are obtained, melting at about 80.5–81.5° C.

EXAMPLE 18

A mixture of 6.5 parts of γ-chloro-4'-chlorobutyrophenone and 10 parts of 1-(2'-pyridyl)piperazine is heated at 110° C. for five hours and then cooled. The mixture is extracted with 100 parts of water and 120 parts of ether. The ether layer is dried over sodium sulfate and filtered. Small pale brown crystals of 1-[γ-(4'-chlorobenzoyl)propyl]-4 - (2' - pyridyl)piperazine precipitate which melt at about 82.5–84.4° C.

Substituting an equivalent of γ-chloro-4'-iodobutyrophenone in the above process yields 1-[γ-(4'-iodobenzoyl)propyl]-4-(2'-pyridyl)piperazine.

EXAMPLE 19

After standing for six hours at 25° C., a mixture of 7.2 parts of β-chloro-4'-fluoropropiophenone and 14 parts of 1-(4'-methyl-2'-pyridyl)piperazine is refluxed in 400 parts of ether, filtered, the filtrate is evaporated in vacuo, and the residue dissolved in ether. After dilution with 450 parts of acetone, hydrogen chloride gas passed through the solution and after standing at 25° C. for two hours, a precipitate is collected. Upon drying, the pale-yellow granular powder of 1-[β-(4'-fluorobenzoyl)ethyl]-4-(4'-methyl-2'-pyridyl)piperazine hydrochloride melts at about 216.5–219.5° C.

EXAMPLE 20

A mixture of 4.4 parts of γ-chloro-4'-fluorobutyrophenone and 7.8 parts of 1-(3'-methyl-2'-pyridyl)-piperazine in 120 parts of benzene is heated in a sealed tube for 24 hours at 125° C. After cooling the mixture is washed twice with water and benzene and dried over sodium sulfate, filtered and evaporated. The residue is dissolved in 120 parts of diisopropyl ether and hydrogen chloride gas is passed through the solution. After filtration, the precipitate is treated with a mixture of 60 parts of isopropanol which contains some hydrochloric acid and 20 parts of diisopropyl ether. The mixture is heated and filtered to yield the precipitate of 1-[γ-(4'-fluorobenzoyl)propyl] - 4 - (3' - methyl - 2' - pyridyl)piperazine hydrochloride, melting about 212–220° C.

EXAMPLE 21

A mixture of 5 parts of γ-chloro-4'-fluorobutyrophenone and 8.9 parts of 1-(4'-methyl-2-pyridyl)-piperazine is heated on an oil bath at 115° C. for eight hours. The mixture is then boiled in diisopropyl ether and the precipitates is collected and boiled with water and benzene. The benzene layer is treated with activated charcoal, added to the ethereal filtrate, and evaporated to give a residue which is taken up in diisopropyl ether. At −20° C. an oil is precipitated, which after decantation yields 1-[γ-(4'-fluorobenzoyl)propyl]-4-(4'-methyl-2'-pyridyl)piperazine. After drying the yellow-brown amorphous powder of this compound melts at about 79.5–81° C.

EXAMPLE 22

A mixture of 5 parts of γ-chloro-4'-fluorobutyrophenone and 9.5 parts of 1-(3'-cyano-2'-pyridyl)-piperazine is heated on an oil bath at 115° C. for eight hours. The mixture is then refluxed with benzene and water. The benzene layer is separated, dried, treated with activated charcoal, and filtered. The mixture is evaporated and the residue dissloved in diisopropyl ether from which recrystallizes upon cooling to yield 1-[γ-(4'-fluorobenzoyl)-propyl]-4-(3' - cyano-2' - pyridyl)piperazine. The light yellow amorphous powder of this compound melts at about 71.5–73.5° C. The compound has the formula

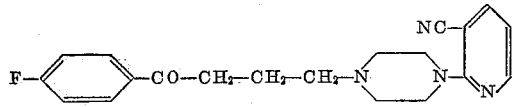

EXAMPLE 23

A mixture of 6 parts of γ-chloro-4'-fluorobutyrophenone and 10 parts of 1-(2'-pyridyl)piperazine is heated for fifty hours on an oil bath at 115° C. and then treated with 100 parts of water and 50 parts of ether. The combined ether layers are dried over magnesium sulfate and filtered. Petroleum ether is added to turbidity and the mixture is kept at −15° C. to yield 1-[γ-(4'-fluorobenzoyl)propyl]-4-(2' - pyridyl)piperazine which melts at 73–75° C.

Substitution of 6.4 parts of γ-chloro-4'-methoxybutyrophenone for γ-chloro-4'-fluorobutyrophenone in the above procedure yields 1-[γ-(4'-methoxybenzoyl)-propyyl]-4-(2'-pyridyl)piperazine which melts at about 75–75.5° C.

EXAMPLE 24

A mixture of 7.7 parts of β-chloro-4'-methoxypropiophenone and 13 parts of 1-(2'-pyridyl)piperazine is refluxed with 320 parts of ether for two hours and then filtered. The filtrate is washed with 300 parts of water, dried over potassium carbonate, and evaporated in vacuo. The solid residue is boiled in 80 parts of diisopropyl ether to effect a solution.

After chilling, the precipitate is filtered and dried in vacuo to yield 1-[β-(4'-methoxybenzoyl)ethyl]-4-(2'-pyridyl)piperazine. The pale yellow granular powder of this compound melts at about 60–61° C. The structural formula of this compound is

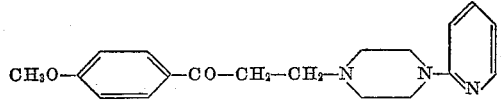

EXAMPLE 25

A mixture of 6.2 parts of γ-chloro-4'-methoxybutyrophenone and 8.9 parts of 1-(6'-methyl-2'-pyridyl)-piperazine is heated on an oil bath at 110° C. for eight hours. On cooling, the mixture is dissolved in 80 parts of ether and 100 parts of water and the layers are separated. The organic layer is treated with diisopropyl ether and petroleum ether and chilled and the crystals of 1-[γ-(4'-methoxybenzoyl)propyl]-4-(6'-methyl-2' - pyridyl)-piperazine are collected. After drying, the pale yellow amorphous powder of this compound melts at about 74–76° C.

EXAMPLE 26

A mixture of 6.2 parts of γ-chloro-4'-methoxybutyrophenone and 8.9 parts of 1-(4'-methyl-2'-pyridyl)-piperazine is heated on an oil bath at 100° C. for eight hours. The reaction mixture is boiled with 100 parts of water and 80 parts of benzene. The water layer is extracted again with benzene. The combined benzene layers are dried over sodium sulfate, treated with activated coal, and filtered. The filtrate is evaporated and the residue taken up in 40 parts of diisopropyl ether. The solution is decanted from the insoluble oil and then cooled to −10° C. to yield 1-[γ-(4'-methoxybenzoyl)propyl]-4-(4'-methyl-2'-pyridyl)piperazine. The white, granular powder of this compound melts at about 69.5–70.5° C.

EXAMPLE 27

A mixture of 6.15 parts of γ-chloro-4'-methoxybutyrophenone and 8.9 parts of 1-(5'-methyl-2'-pyridyl)-piperazine is heated at 100–110° C. for eight hours and then treated with 100 parts of water and 80 parts of benzene. The water layer is extracted again with benzene and the combined benzene layers are dried over sodium sulfate and evaporated. The solid residue is recrystallized from 56 parts of diisopropyl ether, filtered, cooled to 0° C. and dried in vacuo at 40–50° C. to yield 1-[γ-(4'-methoxybenzoyl)propyl]-4-(5'-methyl - 2'-pyridyl)piperazine in a pale yellow, granular powder which melts at about 84.6–86° C.

EXAMPLE 28

A mixture of 7.5 parts of γ-chloro-2',4'-dimethoxybutyrophenone and 11 parts of 1-(2'-pyridyl)piperazine is heated at about 100° C. for three hours and then refluxed in 560 parts of ether for one hour. The precipitate is removed by filtration. The filtrate is washed with 500 parts of water, dried over potassium carbonate, filtered, and evaporated to give an oily residue which is boiled with 160 parts of acetone and activated charcoal for five minutes. After the charcoal is removed, the acetone is evaporated and the oily residue is dissolved in acetone again. Hydrogen chloride gas is passed through the solution and the resulting mixture is cooled to about −20° C. for about two hours. The precipitate is collected and dissolved in 320 parts of butanone and 160 parts of methanol; the solution is concentrated and cooled to −20° C. The precipitate formed is collected and dried in vacuo at 60° C. to yield the impure dihydrochloride. The free base is liberated by dissolving the salt in water and rendered alkaline with 50% sodium hydroxide. The mixture is allowed to cool to −20° C. and the precipitate is collected. After recrystallization from 40 parts of diisopropyl ether, the mixture is again allowed to stand at 0° C. The precipitate is collected to yield the transparent, colorless needles of 1-[γ-(2',4'-dimethoxybenzoyl)propyl]-4-(2'-pyridyl)piperazine which melts at about 84.5–85.5° C.

By substitution of an equimolar amount of γ-chloro-2',4',6'-methoxybutyrophenone in the foregoing procedure is obtained 1-[γ-(2',4',6'-methoxybenzoyl)propyl]-4-(2'-pyridyl)piperazine.

EXAMPLE 29

A mixture of 7.2 parts of γ-chloro-3',4'-dimethoxybutyrophenone and 10.6 parts of 1-(4'-methyl-2'-pyridyl)piperazine is heated for twelve hours at 100° C. After cooling, the oil is extracted with 600 parts of ether and 600 parts of water. The undissolved part is filtered off, washed with ether and dried at room temperature to yield the impure product. This product is then recrystallized from a mixture of 80 parts of diisopropyl ether and 5 parts of acetone, washed with diisopropyl ether and dried to yield the pale brown, microcrystalline powder of 1-[γ-(3',4'-dimethoxybenzoyl)propyl]-4-(4'-methyl-2'-pyridyl)-piperazine which melts at 85.4–86.5° C.

EXAMPLE 30

A mixture of 7.2 parts of γ-chloro-2',4'-dimethoxybutyrophenone and 10.5 parts of 1-(4'-methyl-2'-pyridyl) piperazine is heated at about 100° C. for ten hours. The mixture is then treated with 500 parts of water and 560 parts of ether and separated. The ether layer is washed three times with 300 parts of water, dried over potassium carbonate, and then evaporated. The oily residue is boiled with 320 parts of acetone and activated charcoal for fifteen minutes and then filtered. Hydrogen chloride gas is passed through the filtrate. The mixture is cooled for two hours to about —20° C. The precipitate is collected and dried at about 60° C. for four hours to yield the impure salt. This salt is then combined with the residue of the evaporated mother-liquor dissolved in 500 parts of water and decolorized with charcoal. The free base is regenerated by treatment with sodium hydroxide and extraction with ether. After drying over potassium carbonate the extract is evaporated and the residue is dissolved in 25 parts of diisopropyl ether. On chilling at —20° C., 1-[γ-(2',4'-dimethoxybenzoyl)propyl]-4-(4'-methyl-2'-pyridyl)piperazine is obtained as a yellow amorphous powder melting at about 79–80.8° C.

EXAMPLE 31

A mixture of 6.2 parts of γ-chloro-4'-methoxy-butyrophenone and 9.5 parts of 1-(3'-cyano-2'-pyridyl)-piperazine is heated on an oil bath at 100° C. for eight hours and cooled. The mixture is then boiled with 80 parts of benzene and 50 parts of water. The benzene layer is dried over sodium sulfate, filtered, treated with activated charcoal, and filtered again. The benzene is evaporated and the residue dissolved in 80 parts of diisopropyl ether. A precipitate forms at —20° C., is collected and redissolved in 40 parts of diisopropyl ether. The solution is decanted from the insoluble oil and then cooled to yield 1-[γ-(4'-methoxybenzoyl)propyl]-4-(3'-cyano-2'-pyridyl)piperazine. After drying the white microcrystalline powder of this compound melts at about 73.5–75.5° C.

EXAMPLE 32

A mixture of 5.2 parts of 2-(β-chloropropionyl)-thiophene and 10 parts of 1-(2'-pyridyl)piperazine is allowed to stand at room temperature for 36 hours. The mixture is then boiled with 600 parts of dry ether and the precipitate removed by filtration. The filtrate is evaporated until crystallization begins and the mixture is cooled to 0° C. After filtration and recrystallization from ether, 1-[β-2'-thenoyl)ethyl]-4-(2'-pyridyl)piperazine which melts at about 80–81° C. is obtained.

EXAMPLE 33

A mixture of 84 parts of anhydrous thiophene, 141 parts of γ-chlorobutyryl chloride and 870 parts of anhydrous benzene is cooled to 0 to —5° C. While this temperature is maintained, 260 parts of stannic chloride are added slowly over a 2 hour period. After the addition is complete, the cooling bath is removed and the stirring is continued for about an hour. The reaction mixture is then poured into a mixture of 60 parts of concentrated hydrochloric acid and 450 parts of ice water. The organic layer is separated, washed with water, dried over anhydrous calcium chloride and filtered. The filtrate is concentrated under reduced pressure and the residue is distilled to yield 2-(γ-chlorobutyryl)thiophene which boils at 144–146° C. at 11 mm. of pressure.

A mixture of 5.65 parts of 2-(γ-chlorobutyryl)-thiophene and 10 parts of 1-(2'-pyridyl)piperazine is heated for 50 hours on an oil bath at 115° C. The mixture is then treated with 100 parts of water and 50 parts of ether. The water layer is extracted again with ether. Diisopropyl ether is added to the combined ether layers and the mixture is dried over magnesium sulfate. After evaporation and drying, the pale-brown powder of 1-[γ-(2'-thenoyl)propyl]-4-(2'-pyridyl)piperazine, melting at about 70–71° C. is obtained.

EXAMPLE 34

A mixture of 7 parts of 2-(β-chloropropionyl)-thiophene and 14 parts of 1-(4'-methyl-2'-pyridyl)piperazine is allowed to stand at room temperature for 8 hours. The solid mixture is refluxed with 320 parts of ether for 2 hours and filtered. The mixture is then washed with 300 parts of water, dried over potassium carbonate, and evaporated under vacuum. The residue is boiled in 80 parts of diisopropyl ether and cooled to —20° C. for 5 hours. The precipitate is collected and dried to yield the white powder of 1-[β-(2'-thenoyl)ethyl]-4-(4'-methyl-2'-pyridyl)piperazine which melts at about 92.4–93° C.

EXAMPLE 35

A mixture of 4.8 parts of 2-(γ-chlorobutyryl)-thiophene and 8.9 parts of 1-(5'-methyl-2'-pyridyl)piperazine is heated at 100–110° C. for eight hours. The reaction mixture is then treated with 100 parts of water and 80 parts of benzene. The water layer is washed again with benzene and the combined benzene layers are dried over sodium sulfate and evaporated. The residue is recrystallized from diisopropyl ether to yield 1-[γ-(2'-thenoyl)propyl]-4-(5'-methyl-2'-pyridyl)piperazine, melting at about 89.5–90.5° C.

EXAMPLE 36

A mixture of 4.8 parts of 2-(γ-chlorobutyryl)thiophene and 8.9 parts of 1-(4'-methyl-2'-pyridyl)piperazine is heated on an oil bath at 100° C. for 8 hours. The mixture is then boiled with 100 parts of water and 80 parts of benzene. The water layer is extracted once more with 80 parts of benzene and the combined benzene layers are treated with activated charcoal. After filtration, the organic layer is evaporated and the residue dissolved in diisopropyl ether. At —20° C. an oil precipitates and the supernatant liquid is decanted. The oily layer is crystallized from diisopropyl ether. The pale brown powder of 1-[γ-(2'-thenoyl)propyl]-4-(4'-methyl-2'-pyridyl)piperazine melts at about 65–66° C.

EXAMPLE 37

A mixture of 4.8 parts of 2-(γ-chlorobutyryl)thiophene and 8.9 parts of 1-(6'-methyl-2'-pyridyl)piperazine is heated on an oil bath for 10 hours at 110° C. The mixture is refluxed with 80 parts of diisopropyl ether and the solid residue removed by filtration. From the filtrate, 1 - [γ - (2'-thenoyl)propyl]-4-(6'-methyl-2'-pyridyl)piperazine is crystallized. The pale brown powder of this compound melts at about 107.5–108.5° C.

EXAMPLE 38

A mixture of 4.8 parts of 2-(γ-chlorobutyryl)thiophene and 9.5 parts of 1-(3'-cyano-2'-pyridyl)piperazine is heated on an oil bath for eight hours. The mixture is then boiled with 80 parts of benzene and 50 parts of water. The benzene layer is separated, dried over sodium sulfate, and filtered. The filtrate is treated with activated charcoal. After filtration, the filtrate is evaporated and the residue taken up in diisopropyl ether. The oil which precipitates is removed and the solvent is chilled to yield a solid precipitate of 1-[γ-(2'-thenoyl)propyl]-4-(3'-cyano-2'-pyridyl)piperazine. The yellow powder of this compound melts at about 71.5–72.5° C. It has the structural formula

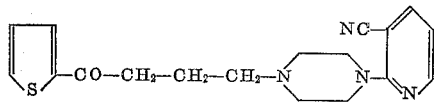

What is claimed is:
1. A compound of the structural formula

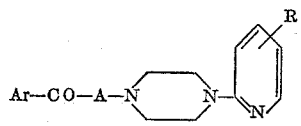

wherein Ar is a member of the class consisting of phenyl, tolyl, halophenyl, methoxyphenyl, dimethoxyphenyl, trimethoxyphenyl, and thienyl radicals; A is a lower alkylene radical; and R is a member of the class consisting of hydrogen, methyl, carboxamido, and cyano radicals.

2. A compound of the structural formula

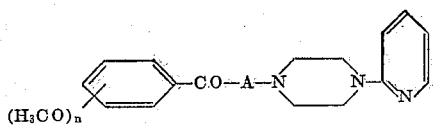

wherein $n$ is a positive integer less than three and A is a lower alkylene radical.

3. 1 - [γ - (3',4'-dimethyoxybenzoyl)propyl]-4-[2-(4'-methyl)pyridyl]piperazine.

4. 1 - [γ - (2',4'-dimethoxybenzoyl)propyl]-4-[2-(4'-methyl)pyridyl]piperazine.

5. A compound of the structural formula

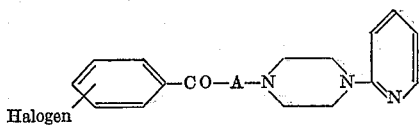

wherein A is a lower alkylene group.

6. 1 - [γ - (4'-fluorobenzoyl)propyl]-4-(2-piperidyl)piperazine.

7. 1 - [γ - (4'-fluorobenzoyl)propyl]-4-[2-(3'-cyano)pyridyl]piperazine.

8. 1 - [γ - (4'-fluorobenzoyl)propyl]-4-[2-(4'-methyl)pyridyl]piperazine.

9. A compound of the structural formula

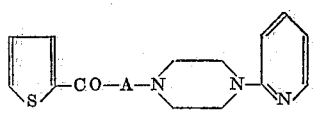

wherein A is a lower alkylene group.

10. 1 - [γ - (2-thenoyl)propyl]-4-[2-(4'-methyl)pyridyl]piperazine.

No references cited.